United States Patent [19]
Schultz et al.

[11] Patent Number: 5,564,785
[45] Date of Patent: Oct. 15, 1996

[54] SEAT FRAME ASSEMBLY FOR A MOTOR VEHICLE

[75] Inventors: Fred B. Schultz, Farmington Hills; Philip W. Hadley, W. Bloomfield; Paul W. McGlinnen, Novi; Frank Q. Liu, Canton, all of Mich.

[73] Assignee: Atoma International Inc., Ontario, Canada

[21] Appl. No.: 323,248

[22] Filed: Oct. 17, 1994

[51] Int. Cl.⁶ ................................................ A47C 7/02
[52] U.S. Cl. .................... 297/452.2; 297/473; 297/367
[58] Field of Search ...................... 247/452.2, 452.18, 247/483, 468, 354.12, 452.55, 473, 367

[56] References Cited

U.S. PATENT DOCUMENTS

| | | |
|---|---|---|
| 2,838,100 | 6/1958 | Follows . |
| 3,586,376 | 6/1971 | LeMire . |
| 3,822,079 | 7/1974 | Probber . |
| 5,246,271 | 9/1993 | Boisset . |
| 5,362,132 | 11/1994 | Griswold et al. . |
| 5,390,982 | 2/1995 | Johnson et al. . |
| 5,437,498 | 8/1995 | Waelde . |
| 5,452,941 | 9/1995 | Halse et al. . |

*Primary Examiner*—Milton Nelson, Jr.
*Attorney, Agent, or Firm*—Cushman, Darby & Cushman

[57] ABSTRACT

A seat frame assembly for a motor vehicle comprises a seat frame and a seat back frame. The seat frame and seat back frame are adapted to have cushions mounted thereon. At least one of the vertical support portions is formed from a pair of telescoping tubular blanks including an elongated inner metal blank formed into an integrally formed vertical member extending from a lower portion of the seat back frame to an upper end of the seat back frame and a relatively shorter outer metal blank formed into a sleeve rigidly secured in surrounding relation to the lower portion of the vertical support member. The outer and inner blanks are formed into the sleeve and the vertical member respectively during a hydroforming process in which the inner blank is expanded so that an outer surface thereof is moved into peripheral contact with an inner surface of the outer blank and the inner blank and the outer blank are expanded into peripheral contact with die surfaces defining the exterior surfaces of the one vertical support portion.

15 Claims, 4 Drawing Sheets

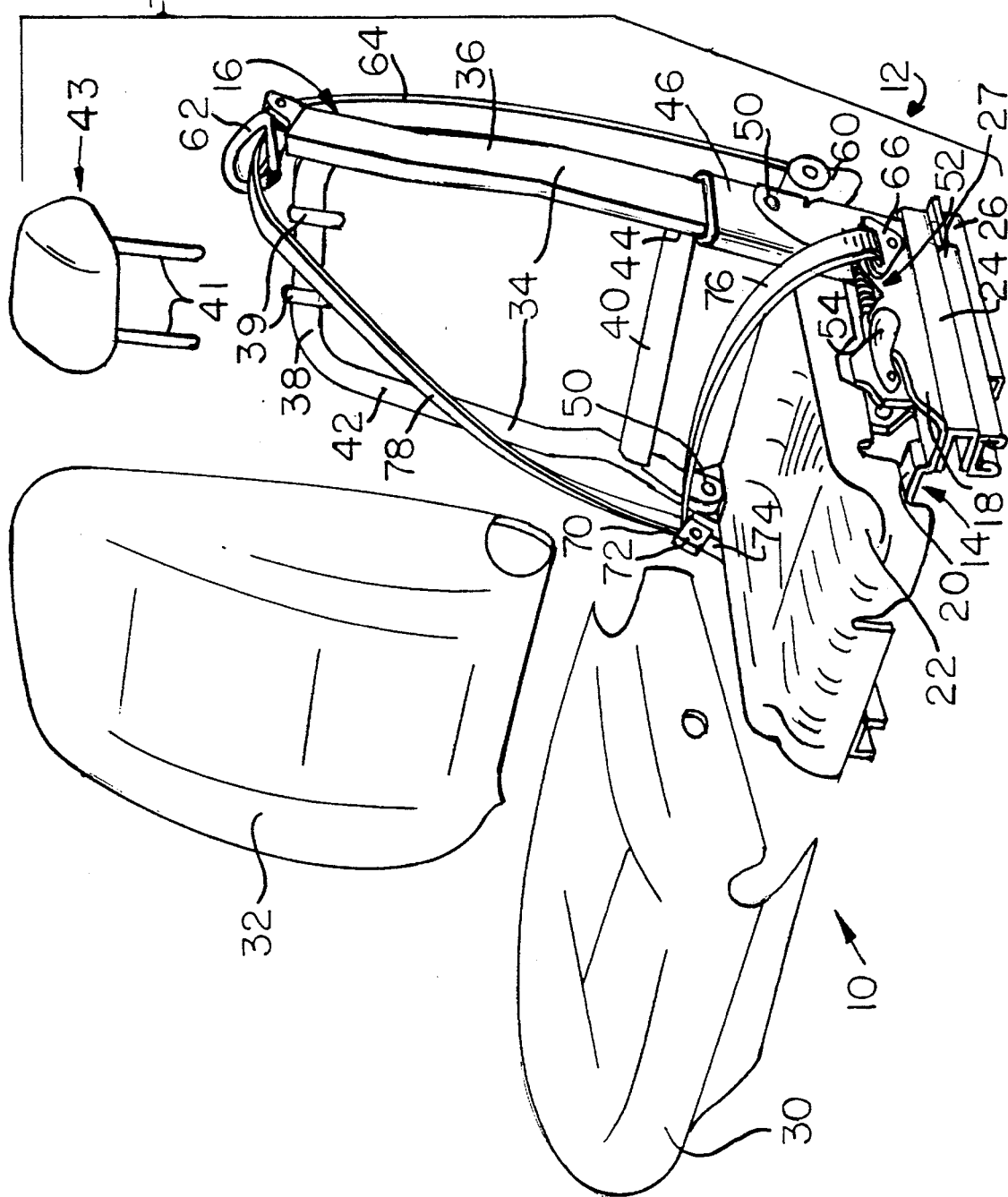

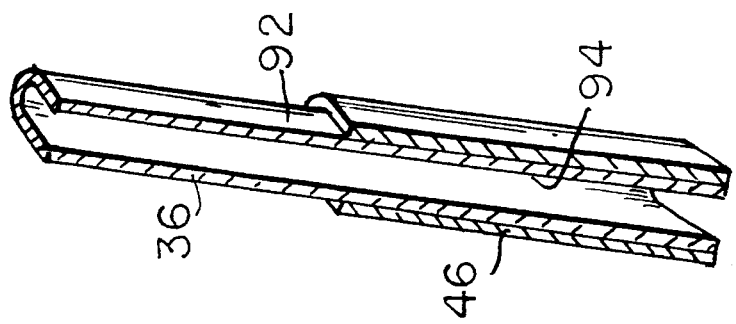
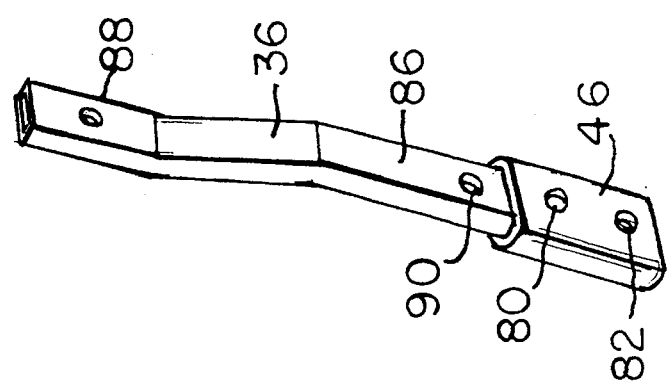
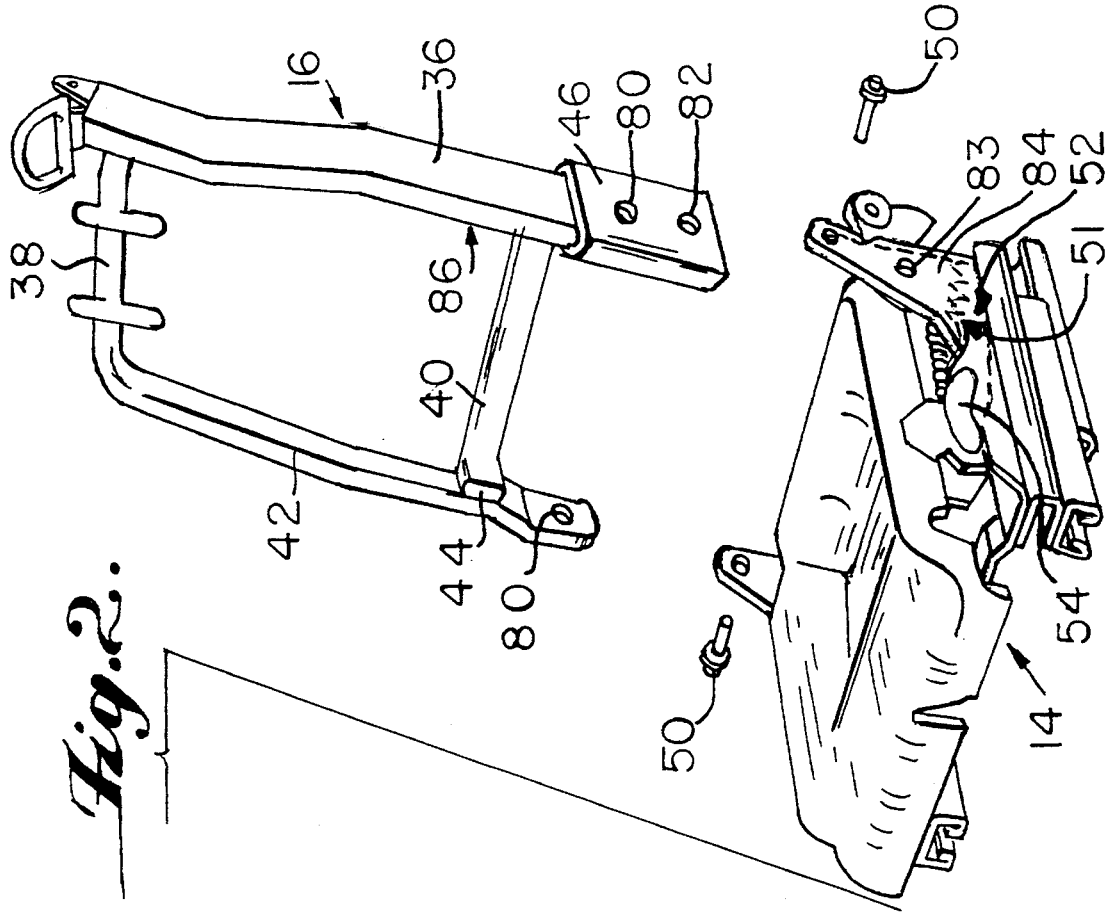

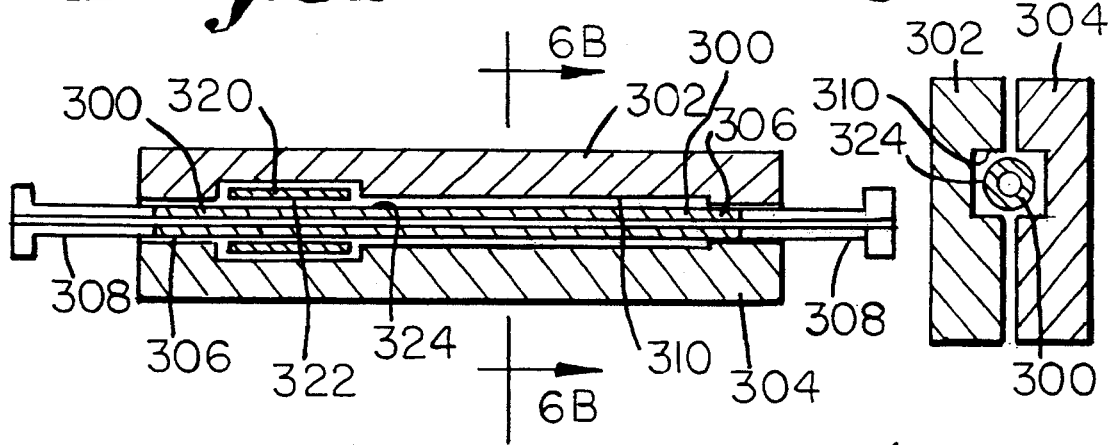
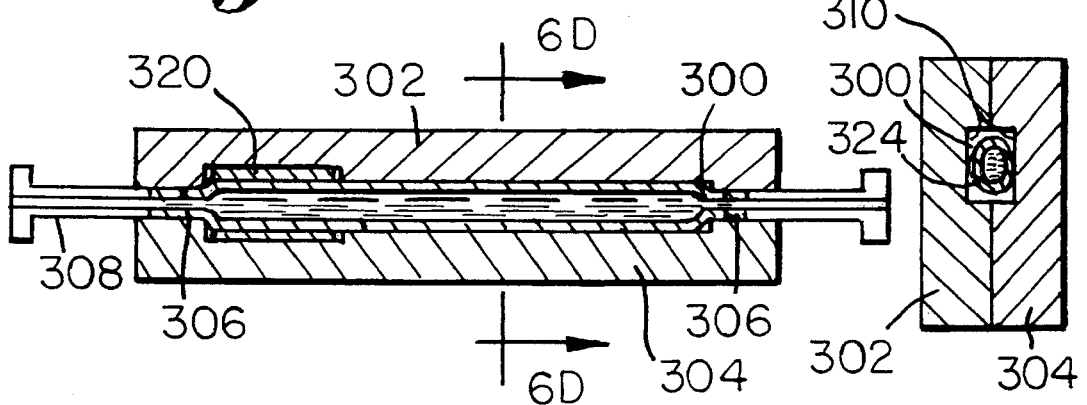
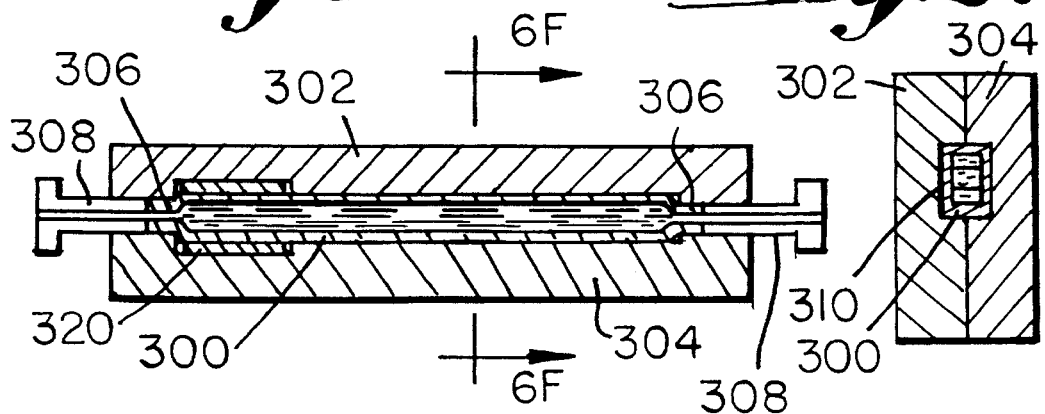

SEAT FRAME ASSEMBLY FOR A MOTOR VEHICLE

BACKGROUND OF THE INVENTION

The present invention relates to seat frame assemblies for motor vehicles and a method for forming the same.

In a typical motor vehicle, the vehicle seats are constructed with a metal seat frame assembly, including a seat back frame and seat frame, and a seat back cushion and seat cushion mounted in overlying relation on the seat back frame and seat frame, respectively. The seat back frame has lower portions thereof operatively connected with rearward portions of a metal seat frame. The seat frame can be of several different configurations, such as the cross-wire type in which a plurality of parallel and/or diagonal metal cross wires are interconnected between support brackets formed into a substantially rectangular configuration, and the pan type in which a shallow rectangular pan is mounted on support brackets. Seat back frames, on the other hand, typically include a pair of spaced vertical support portions defining opposite sides thereof and rigid horizontal support members interconnected therebetween. The seat back frames also may include the parallel/diagonal cross wires.

The connection between the seat back frame and seat frame is usually formed with a reclining mechanism that is capable of permitting the seat back frame to be pivotally movable with respect to the seat frame so as to enable a seat occupant to adjust the angle at which the seat back cushion is reclined with respect to the seat cushion for maximized comfort. Because the reclining mechanism connects the rearward portion of the seat frame with the lower portion of the vertical supports of the seat back frame, it can be appreciated that the lower portion of the spaced vertical supports are particularly subjected to large amounts of mechanical stresses, especially when the seat back is reclined at large angles with respect to the seat, and even more so when an individual occupies the seat.

While it is important to manufacture the vehicle seat frame assembly with sufficient strength, it is equally important that the frame assembly not be made from excessive amounts of metal, otherwise material costs and vehicle weight will be unnecessarily high. Thus, for the most part, the vertical support portions and cross members of the seat back frame are hollow (tubular) in form. To accommodate for the aforementioned mechanical stresses, however, it has been known to manufacture at least one of the spaced vertical supports with a relatively large wall thickness, cross sectional diameter and strength. It is especially important for the lower portion of the heavier vertical support, where the majority of the stress is encountered, to be of superior strength. While it is possible for both vertical support portions to be of the heavier construction (and is actually preferred in a bench seat configuration), sufficient strength for a single occupant seat (such as a bucket seat) is accomplished with only one of the vertical supports manufactured in such fashion. Providing only one of the vertical supports with a heavier construction is advantageous because less metal, without compromising frame strength.

The heavier vertical support portion (or "main vertical support") is also advantageous because it enables the frame to mount a vehicle seat belt. More specifically, in certain vehicles, it may be desirable to mount a seat belt assemblies directly to the seat, as opposed to the vehicle floor. To accomplish this, however, it is necessary to manufacture the seat frame with sufficient rigidity and strength to withstand the inertial forces encountered in a collision. With the heavy vertical support member, a shoulder belt guide can be mounted on an upper end thereof without the potential for buckling of the main vertical support member in a collision. A belt reel can then be mounted at a rearward portion of the seat frame in proximity to the lower portion of the main vertical support member. The belt extends upwardly behind the seat back frame and through the shoulder belt guide forwardly of the seat back frame, and then downwardly until it terminates at an anchor fixed to the rearward side of the seat frame, adjacent the reclining mechanism. A belt clasp is slidingly disposed on a portion of the belt between the belt guide and the anchor. A separate belt member is anchored at a side of the seat frame opposite the reclining mechanism, and terminates at a belt latch fixed thereto. A seat occupant can then easily grasp the belt clasp on the shoulder belt and bring it over his or her shoulder, diagonally across the chest and into latching engagement with the belt latch. With the shoulder belt guide mounted on an upper corner portion of the seat back frame, it can be appreciated that, upon a collision, the main vertical support mounting the shoulder belt guide is once again subjected to a great amount of mechanical stress, especially towards the lower portion thereof.

In producing the main vertical support, manufacturers conventionally employ a stamping technique. Stamping is accomplished by utilizing one or more opposing stamping die members which compress (by impact) a sheet of raw steel therebetween into a desired configuration. To manufacture the main vertical support by stamping, two separate longitudinal sheets of material are individually stamped into a C-shaped transverse cross-section configuration, and then seam welded in facing relation into a tubular configuration.

While it may be desirable to manufacture a main vertical support which is straight, the more usual situation requires the main vertical support to be somewhat bent to accommodate the desired shape of the seat. Thus, after assembly into an elongated tubular configuration, the main vertical support may be bent in a bending mill as required. Alternatively, the individual C-sections may be stamped into a particular shapes that will provide the desired bends when assembled into the final main vertical support.

The stamping process is relatively slow, as it requires raw material to be stamped, then seam welded into tubular elongated form, and then optionally bent. In addition, the process is relatively expensive, as stamping dies and equipment are costly and must be replaced on a frequent basis. Another problem associated with stamping a straight metal sheet is that a significant amount of raw material is often wasted, especially where irregularly shaped frame parts are required. More specifically, where irregular shapes are to be stamped from a sheet of raw metal, there is a significant amount of peripheral material at the side edges of the sheet that cannot be used, irrespective of how closely the stamped shapes are nested on the sheet. In one analysis, it was found that up to 30% of a roll of raw material could not be used due to the irregular shape of the stamped part. It can be appreciated that, at high volumes, the amount of material wasted, and costs associated therewith, is significant in the stamping method. It can also be appreciated that labor, material, and equipment costs associated with manufacturing and assembly of stamped frame members is significant.

In recent years, a hydroforming procedure has been used to replace stamping for certain applications. For example, hydroforming is proposed as a preferred method of forming a vehicle siderail frame assembly in copending U.S. patent application No. 08/314,496. Hydroforming utilizes fluid pressure applied internally to a tubular blank to expand the blank into an irregular shape. More particularly, the tubular blank is placed into a hydroforming mold, and water pressure of up to 10,000 atmospheres, and possibly even greater, is provided interiorly to the blank as opposite ends of the blank are pushed inwardly to obtain material flow. The tubular blank eventually takes the shape of the interior surface of the hydroforming mold. During the hydroforming process, the amount of metal per unit length of tube is varied. More specifically, as the linear exterior circumference is outwardly expanded, metal is replenished from the side portions so that the wall thickness can be maintained within ±10% of the original blank. In the areas of greatest expansion, the exterior circumference can be increased by more than 16%, while the wall thickness is maintained within the ±10% range.

Strengthening of certain portions of a hydroformed tubular member can be accomplished by expanding those portions more than others. The greater the expansion, the greater the amount of metal per unit length will be provided, and the harder the metal will become.

The inventors of the present invention have contemplated use of hydroforming to manufacture a seat back frame main vertical support. The hydroforming technique is more cost effective than stamping, as a single tubular blank can be formed into a desired elongated integral tubular configuration, without welding or bending. In addition, because metal is stretched during the hydroforming process, it is mechanically strengthened, and less material needs to be used in forming the required diameter tubular structure.

However, as described above, in the hydroforming technique, the wall thickness remains relatively constant, even as the tubular blank is expanded. Thus, while the hydroformed tube can be strengthened in certain areas by expansion, the process is limited in its ability to produce a tubular member that has a greater wall thickness at certain areas, as is desirable in manufacturing a main vertical support for a seat back frame. While the entire main vertical support can be provided with as great a wall thickness as desired throughout, an unnecessarily large amount of material would need to be used toward the upper portions of the main vertical support to accommodate the desired thickness towards the lower portions.

There is thus a need to provide a seat frame assembly which overcomes all of the problems noted above. It is therefore an object of the present invention to meet this need. According to the present invention, there is provided a seat frame assembly for a motor vehicle comprising a seat frame and a seat back frame. The seat frame is constructed and arranged to have a seat cushion mounted thereon in overlying relation. The seat back frame is connected with the seat frame and has a pair of spaced metallic vertical support portions at opposite sides thereof, the seat back frame constructed and arranged to have a seat back cushion mounted thereon. At least one of the vertical support portions are formed from a pair of telescoping tubular blanks including an elongated inner metal blank formed into an integrally formed vertical member of said at least one vertical portion extending from a lower portion of the seat back frame connected with the seat frame to an upper end of the seat back frame and a relatively shorter outer metal blank formed into a sleeve rigidly secured in surrounding relation to the lower portion of the vertical support member. The outer blank and inner blank are formed into the sleeve and the vertical member respectively during a hydroforming process in which the inner blank is expanded so that an outer surface thereof is moved into peripheral contact with an inner surface of the outer blank and the inner blank and the outer blank are expanded into peripheral contact with die surfaces defining the exterior surfaces of the one vertical support portion.

It is a further object of the present invention to provide a method for manufacturing a seat frame assembly for a motor vehicle. The method comprises the steps of forming a seat frame adapted to support a seat cushion mounted thereon; forming a seat back frame having a pair of spaced vertical tubular support portions at opposite sides thereof and adapted to support a seat back cushion mounted thereon, one of the vertical support portions having a generally greater weight and diameter than the other and formed by 1) telescopingly moving a sleeve member over one end portion of a metallic tubular member, 2) placing the metallic tubular member with the sleeve into a cavity of a die mold, the die mold having an interior surface defining a shape of the cavity, 3) providing a fluid internally to the metallic tubular member with sufficient pressure so as to expand the tubular member outwardly so that an exterior surface thereof at the one end portion is moved into peripheral surface engagement with an interior surface of the sleeve, and so that other portions of the tubular member are moved into engagement with the interior surface of the die mold to substantially conform the tubular member to the designed shape of the cavity.

It is understood that the benefits of accomplishing strength at the lower portions of the main vertical support are important irrespective of whether a reclining mechanism connects the seat frame with the seat back frame and whether a belt is attached to the main vertical support, due to the stresses present when an occupant is in the seat.

It is a further object of the present invention to provide an entire seat assembly which incorporates the seat frame assembly manufactured in accordance with the principles of the present invention.

DETAILED DESCRIPTION

FIG. 1 is an exploded view showing a seat assembly manufactured in accordance with the principles of the present invention.

FIG. 2 is an exploded view similar to the view in FIG. 1, but showing the seat back frame detached from the seat frame.

FIG 3 is a perspective view showing the main vertical support member, together with sleeve of the present invention.

FIG. 4 is a cut-away sectional view taken along the line 4—4 in FIG. 3.

Figure 5:
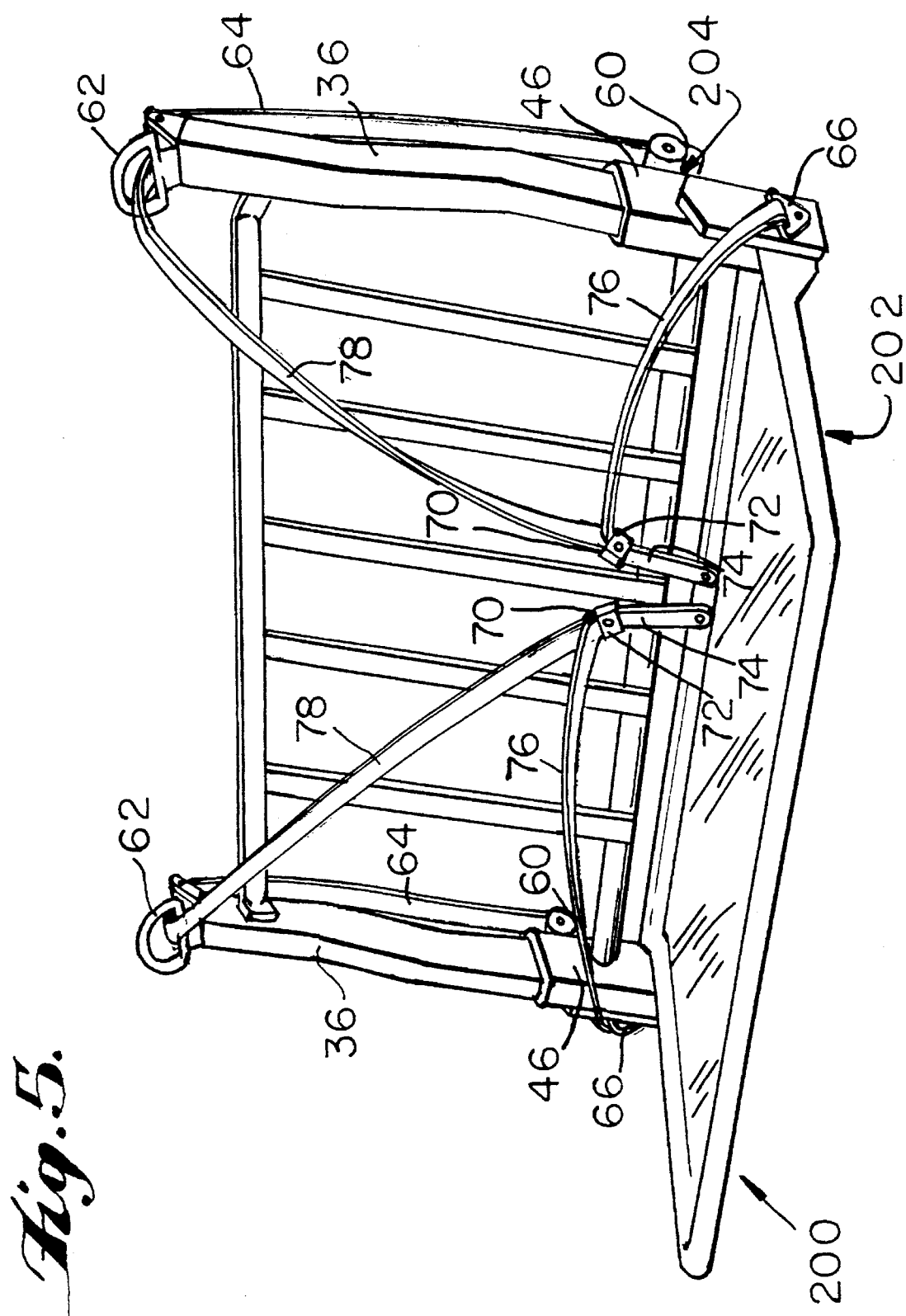
FIG. 5 is a perspective view, showing the main vertical support member and sleeve of the present invention employed in a bench seat frame assembly.

FIGS. 6(A)–6(F) show method steps used in forming the vertical support portion with the greater weight and diameter, including the vertical main vertical support and sleeve, in accordance with the principles of the present invention.

FIG. 1 is an exploded view showing a seat assembly, generally indicated at 10, manufactured in accordance with the principles of the present invention. The seat assembly includes a seat frame assembly, generally indicated at 12, including a seat frame, generally indicated at 14, and a seat back frame, generally indicated at 16. Seat frame 14 includes a pair of side brackets 18 (only one shown), and forward and rearward transverse brackets 20 (only the forward bracket being shown) forming a substantially rectangular frame support. Mounted on the transverse and side brackets 20 and 18 is a pan-type frame member 22. It is to be understood that the present invention is not limited to this type of seat frame, and that any type of seat frame can be provided.

The seat frame 14 is mounted on a mounting bracket 24, which is in turn mounted on a slide rail assembly, including a lower slide rail 26 and upper slide rail 27. The upper rail 27 is slidably mounted on the lower rail 26 to permit the seat frame assembly to be forwardly and rearwardly slidable into a desired position when mounted within a vehicle. A seat cushion 30 and seat back cushion 32 can be mounted in overlying relation on seat frame 14 and seat back frame 16, respectively.

The seat back frame 16 includes a pair of spaced vertical tubular support portions 34 at opposite sides thereof. As shown, one of the vertical tubular support portions 34 includes a main vertical support member 36, which has a generally greater weight and diameter than the opposite vertical support member 42.

A pair of horizontal support members, including an upper horizontal support 38 and lower horizontal support 40 interconnect the two tubular vertical support portions 34. As shown, it can be appreciated that one or more of the horizontal supports may be integrally formed with the smaller vertical support member 42. For example, in FIG. 1, the upper horizontal support 38 is integrally formed with the opposite vertical support 42, while the lower horizontal support 40 is connected to vertical support 42, for example, by a welded or braised connection 44. The upper horizontal support 38 is provided with slots 39 adapted to receive stem members 41 of a conventional headrest 43. Preferably, the horizontal supports 38, 40 and vertical support 42 are formed by rolling a sheet of raw metal material into a tubular configuration, and then seam welding.

As also shown in FIG. 1, the lower portion of main vertical support member 36 has an outer sleeve 46 rigidly secured in surrounding relation thereto. The outer sleeve 46 has an inner peripheral surface thereof disposed in surface-to-surface contact with the outer peripheral surface of the lower portion of main vertical support member 36. The support member 36 is integrally formed from a single tubular blank during a hydroforming process, without the need to weld plural tubular members end-to-end. The main vertical support member 36 and outer sleeve 46 are joined to form a completed vertical support portion during the hydroforming process, which will be described in greater detail later.

Appropriate fasteners 50 pivotally connect rearward portions of the seat frame with lower portions of the seat back frame. The fasteners may be considered as forming part of a reclining assembly, including a reclining mechanism generally indicated at 52, that operatively connects rearward portions of the seat frame with lower portions of the seat back frame for pivotal movement. More particularly, the reclining mechanism 52 rigidly connects the outer sleeve 46 and lower portion of main vertical support member 36 with a rearward portion of one side of the seat frame. For example, in FIG. 1, the reclining mechanism 52 connects outer sleeve 46 and lower portion of the main vertical support member 36 with a rearward, left-hand side of the seat frame 14 from the perspective of a seat occupant. It can be appreciated, however, that if the main vertical support member 36 were to be provided at the rearward right-hand side of the seat back frame 16, the reclining mechanism would then be provided towards the rearward right-hand side of the seat frame 14. The reclining mechanism 52 includes a manually movable handle 54 which can be manually pivoted to unlatch a latching mechanism 51, shown generally in dashed lines in FIG. 2, to enable the seat back frame 16 to be pivotally movable with respect to the seat frame 14.

The seat frame assembly 12 is also provided with a seat belt assembly, including a belt retractor or reel 60 mounted on a rearward portion of seat frame 14, in proximity with the lower portion of main vertical support member 36. The belt reel 60 can be of any conventional type. Fixed at the top portion of main vertical support member 36 is a belt guide 62 which receives belt 64 as it is pays out of belt reel 60. The belt extends from belt guide 62 downwardly in front of the seat back frame and terminates at anchor 66 fixed at the rearward left-hand portion of side bracket 18. Intermediate the ends of belt 64 between the belt guide 62 and end 66 is a conventional belt clasp 70 slidably disposed along the belt and connectable with belt latch 72. Belt latch 72 is fixed at an end of a second belt member 74 anchored at an opposite end to a side bracket 18 in similar fashion to anchor 66. The clasp 70 is received in belt latch 72 to thereby form belt 64 into a lap belt portion 76 and shoulder belt portion 78, as shown.

Referring now to FIG. 2, the seat back frame 16 is shown detached from seat frame 14. As also shown, the vertical support portions 34 are each provided with bolt holes 80 for connection by fasteners 50 to seat frame 14. The main vertical support 36 and sleeve 46 are also provided with a second bolt hole 82 for connection with bolt hole 83 through rotatable arm 84 (shown in dashed lines) of reclining mechanism 52 with an appropriate fastener (not shown). Rotatable arm 84 is rotatable with respect to the seat frame 14 when lever 54 is manually moved to permit the seat back frame to be reclined.

FIG. 3 is a perspective view showing the main vertical support member 36, together with sleeve 46 of the present invention. In FIG. 3, the support member has been turned 180 degrees from the view in FIG. 2, so as to show the surface 86 normally facing the opposite support member 42 and not seen in FIG. 2. As shown, surface 86 is preferably provided with upper and lower openings 88 and 90, which are adapted to receive ends of upper and lower horizontal supports 38 and 40, respectively. The ends are then seam welded in place within the openings. Alternatively, openings 88 and 90 can be omitted, and the ends of horizontal supports can be welded or brazed as shown at connection 44 of the lower horizontal support with vertical support 42.

FIG. 4 is a cut-away sectional view taken along the line 4—4 in FIG. 3. As shown, the exterior peripheral surface 92 of the main vertical support 36 is in peripheral surface-to-surface contact with the inner peripheral surface 94 of sleeve 46.

FIG. 5 is a perspective view, showing the main vertical support member 36 and sleeve 46 of the present invention employed in a bench seat frame assembly, generally indicated at 200. The bench seat frame assembly is normally positioned as a back seat in a vehicle, and is adapted to carry plural passengers (e.g., up to four). The bench seat frame assembly includes a seat frame 202 and a seat back frame 204. Because the bench seat frame is longer than the seat shown in FIGS. 1 and 2, for added support it is preferable to manufacture the seat back frame 204 with two main vertical support members, one at each end, as shown. Each main vertical support includes a belt guide 62 to accommodate respective seat belt assemblies. While not shown in FIG. 5, the bench seat frame assembly 200 may be provided with up to two reclining mechanisms at opposite sides thereof to permit the seat back frame 204 to be pivoted relative to the seat frame 202.

Referring now to FIGS. 6(A)–6(F), there is shown a method for forming the vertical support portion with the greater weight and diameter, including the vertical main vertical support 36 and sleeve 46. As shown in FIG. 6(A), a tubular blank 300 is inserted between cooperating die halves 302 and 304. The blank can be manufactured by any known process. Preferably, the blank can be formed by rolling a sheet of metallic material into a complete closed tubular section and then seam-welding lit. If desired, the tubular blank 300 can be pre-bent mechanically before insertion into the hydroforming die, for example, by use of mandrels in a CNC (computer numerically controlled) bending machine. The pre-bending minimizes the amount of bending that must be accomplished during hydro-forming.

Before tubular blank 300 is placed in the die, a tubular outsert 320 (or outer blank) is telescopingly placed in surrounding relation over one end of the tubular member that is to become the lower portion of the main vertical support member 36. During the hydroforming process, the tubular outsert will be formed into sleeve 46 disposed about the lower portion of support member 36, as described hereinbefore.

After the tubular member 300 and outsert 320 are inserted into the die, hydroforming ports 308 are engaged with opposite ends 306 of the tubular structure 300, and sealed thereto. As the die halves 302 and 304 are moved towards one another, the tube 300 is slightly crushed, for example into an oval cross-sectional shape, as shown in FIG. 6(D). The outsert 320 may also be crushed in similar fashion.

Next, high pressure water, of up to 10,000 atmospheres is provided through the hydroforming ports 308 and into the inner confines of tubular structure 300. This high pressure causes the tubular structure to expand outwardly so that portions of outer surface 324 thereof surrounded by outsert 320 are moved into peripheral engagement with the inner surface 322 of outsert 320, and other portions of outer surface 324 are forced into peripheral engagement with the interior surface 310 defining the cavity within the die. The expansion of blank 300 into peripheral engagement with outsert 320 causes a corresponding expansion of outsert 320. Eventually, the tubular blank 300 and outsert 320 substantially take a rectangular cross-sectional shape to conform to the interior surface 310 of the die (e.g., see FIG. 6(F)).

As the high pressure fluid is provided into the tubular structure, it is preferrable for hydroforming ports 308 to be forced inwardly against the opposite ends 306 of the blank to replenish the wall thickness of the metal as it expands into contact with the inner surface 310 of the die. The present invention contemplates, however, that the expansion can be accomplished without pushing in the opposite ends of the of the blank. Where the opposite ends are not inwardly pushed to replenish the metal, expansion should be limited to 5%. Expansion more than this amount without replenishing metal from the side portions of the blank may cause an excessive reduction in wall thickness.

If desired, openings 88 and 90 shown in FIG. 3 for receiving horizontal cross members 38 and 40 can be formed during the hydroforming process by providing vent ports at portions in the molding die at which the openings are to be formed, and momentarily opening the vent ports to blow holes through the tubular structure.

It can be appreciated that during the aforementioned hydroforming process, the amount of metal per unit length of tube is varied. More specifically, as the linear exterior circumference is outwardly expanded, metal is replenished from the side portions so that the wall thickness is maintained within ±10% of the original blank. In the areas of greatest expansion, the exterior circumference is increased by more than 16%, while the wall thickness is maintained within the ±10% range.

In FIG. 6(E), it can be seen that the ends 306 are deformed as a result of the hydroforming process. Preferably, these end are cut off in a subsequent process before the hydroformed assembly is incorporated into a seat frame assembly.

The hydroforming molding technique employed herein is disclosed in greater detail, for example, in "Industrieanzeiger" No. 20 of 9, Mar. 1984; and "Metallumformtechnik"Issue 1D/91, zp. 15 ff: A. Ebbinghaus: "Precision Workpieces in Light Construction, Manufactured Through Internal High Pressure Mouldings"; and "Werkstatt und Betrieb" 123 (1990), 3, P. 241-243: A. Ebbinghaus: "Economic Construction with Internal High Pressure Moulded Precision Workpieces": and "Werkstatt und Betrieb" 122 (1991), 11 (1989), P. 933–938, the above publications being fully incorporated herein by reference.

While the invention has been illustrated and described in detail in the drawings and foregoing description, the same is to be considered as illustrative and not limiting in character, it being understood that the preferred embodiment has been shown and described and that all changes and modifications that come within the spirit and scope of the appended claims are to be protected.

What is claimed is:

1. A seat frame assembly for a motor vehicle comprising:

a seat frame constructed and arranged to enable a seat cushion to be mounted thereon in overlying relation with respect thereto;

a seat back frame connected with said seat frame and having a pair of spaced metallic vertical support portions at opposite sides thereof, said seat back frame constructed and arranged to enable a seat back cushion to be mounted thereon, at least one of said vertical support portions comprising an integrally formed elongated vertical member extending from a lower portion thereof connected with said seat frame to an upper portion thereof terminating generally at an upper end of said seat back frame, and a sleeve relatively shorter than the vertical member and rigidly secured in surrounding relation to said lower portion of said vertical member, said vertical member and said sleeve being formed from a pair of telescoping tubular blanks including an elongated inner metal blank and an outer blank shorter than the inner blank, said outer blank and inner blank being formed into said sleeve and said vertical member respectively during a hydroforming process in which said inner blank is expanded so that an outer surface thereof is moved into peripheral contact with an inner surface of said outer blank and in which said inner blank and said outer blank are expanded together so that the outer blank is moved into peripheral contact with die surfaces defining an exterior configuration of said at least one vertical support portion.

2. A seat frame assembly according to claim 1, further comprising a reclining mechanism operatively connecting rearward portions of said seat frame with lower portions of said seat back frame to enable said seat back frame to be pivotally movable with respect to said seat frame, said reclining mechanism rigidly connecting, on one side of the seat frame assembly, said seat frame with the sleeve and lower portion of said vertical member.

3. A seat frame assembly according to claim 1, further comprising a seat belt assembly including a seat belt reel fixed to said seat frame assembly, a belt guide fixed at an upper end of said vertical member on one side of the seat frame assembly, a main belt paying outwardly from said belt reel at one end and extending upwardly therefrom through said belt guide, said main belt extending downwardly from said belt guide and having an opposite end anchored to said seat frame on said one side of the seat frame assembly, a belt clasp associated with said main belt and disposed thereon in slidably movable relation between said belt guide and said opposite end of the main belt, a second belt anchored at one end to said seat frame at a side of the seat frame assembly opposite said one side and having an opposite end, a belt latch associated with said opposite end of said second belt and adapted to receive said belt clasp in latching engagement.

4. A seat frame assembly according to claim 1, further comprising upper and lower horizontal supports interconnected between said spaced vertical support portions.

5. A seat frame assembly according to claim 4, wherein said spaced vertical support portions comprise respective outer surfaces facing one another, said outer surfaces having upper and lower openings formed therein for receiving said upper and lower horizontal supports, and wherein said upper and lower horizontal supports are welded to edges defining said upper and lower openings.

6. A seat frame assembly according to claim 4, wherein said upper horizontal support is integrally formed with one of said vertical support portions.

7. The invention according to claim 1, wherein said seat frame assembly comprises a bench seat frame assembly wherein each of said spaced metallic vertical support portions respectively comprises 1) one said integrally formed elongate vertical member extending from the lower portion thereof connected with said seat frame to the upper portion thereof terminating generally at the upper end of the seat back frame, and 2) one said sleeve relatively shorter than the vertical member and rigidly secured in surrounding relation to the lower portion of the vertical member, each said vertical support portion having said elongate vertical member and said sleeve thereof formed from a pair of telescoping tubular blanks including 1) an elongated inner metal blank which is to be formed into said integrally formed vertical member, and 2) an outer metal blank shorter than the inner blank and formed into said sleeve rigidly secured in surrounding relation to said lower portion of said vertical member, each said vertical support portion having said sleeve and said vertical member thereof formed from said outer blank and inner blank respectively during a hydroforming process in which said inner blank is expanded so that an outer surface thereof is moved into peripheral contact with an inner surface of said outer blank and in which said inner blank and said outer blank are expanded together so that the outer blank is moved into peripheral contact with die surfaces defining an exterior configuration of the associated vertical support portion.

8. A seat frame assembly according to claim 7, further comprising a pair of seat belt assemblies, each including a seat belt reel fixed at one side of said seat frame assembly, a belt guide fixed at an upper end of an associated one of said vertical support members, a main belt paying outwardly from said belt reel at one end thereof and extending upwardly therefrom through said belt guide, said main belt extending downwardly from said belt guide and having an opposite end anchored to a side of said seat frame adjacent said associated one of said vertical support members, a belt clasp associated with said main belt and disposed thereon in slidably movable relation between said belt guide and said opposite end of the main belt, a second belt anchored to said seat frame at a position on the seat frame laterally spaced from the position at which the main belt is anchored and having an opposite end, a belt latch associated with said opposite end of said second belt constructed and arranged to receive said belt clasp in latching engagement.

9. A seat frame assembly according to claim 8, further comprising upper and lower horizontal supports interconnected between said spaced vertical support portions.

10. A seat assembly for a motor vehicle comprising:

a seat frame;

a seat cushion mounted on said seat frame;

a seat back frame connected with said seat frame;

a seat back cushion mounted on said seat back frame;

said seat back frame having a pair of spaced metallic vertical support portions at opposite sides thereof, at least one of said vertical support portions comprising an integrally formed elongate vertical member extending from a lower portion thereof connected with said seat frame to an upper portion thereof terminating generally at an upper end of said seat back frame, and a sleeve relatively shorter than the vertical member and rigidly secured in surrounding relation to said lower portion of said vertical member, said vertical member and said sleeve being formed from a pair of telescoping tubular blanks including an elongated inner metal blank and an outer blank shorter than the inner blank, said outer blank and inner blank being formed into said sleeve and said vertical member respectively during a hydroforming process in which said inner blank is expanded so that an outer surface thereof is moved into peripheral contact with an inner surface of said outer blank and in which said inner blank and said outer blank are then expanded together so that the outer blank is moved into peripheral contact with die surfaces defining an exterior configuration of said at least one vertical support portion.

11. A seat assembly according to claim 10, further comprising a reclining mechanism operatively connecting rearward portions of said seat frame with lower portions of said seat back frame to enable said seat back frame to be pivotally movable with respect to said seat frame, said reclining mechanism rigidly connecting, on one side of the seat frame assembly, said seat frame with the sleeve and lower portion of said vertical member.

12. A seat assembly according to claim 11, further comprising a seat belt assembly including a seat belt reel fixed to a rearward portion of said seat frame, a belt guide fixed at an upper end of said vertical support member, a main belt paying outwardly from said belt reel at one end and extending upwardly therefrom through said belt guide, said main belt extending downwardly from said belt guide and anchored to a side of said seat frame at another end, a belt clasp associated with said main belt and disposed thereon in slidably movable relation between said belt guide and said end at which the main belt is anchored to said seat frame, a second belt anchored at one end to said seat frame at a side opposite the side at which said the main belt is anchored and having an opposite end, a belt latch associated with said opposite end of said second belt and adapted to receive said belt clasp in latching engagement.

13. A seat assembly according to claim 10, further comprising upper and lower horizontal support members interconnected between said spaced vertical support portions.

14. A seat assembly according to claim 13, wherein said vertical support portions comprise respective outer surface facing one another, said outer surfaces having upper and lower openings formed therein for receiving said upper and lower horizontal supports, and wherein said upper and lower horizontal supports are welded to edges defining said upper and lower openings.

15. A seat assembly according to claim 13, wherein said upper horizontal support is integrally formed with one of said vertical support portions.

\* \* \* \* \*